US010717897B2

(12) United States Patent
Gibanel et al.

(10) Patent No.: US 10,717,897 B2
(45) Date of Patent: Jul. 21, 2020

(54) POLYCYCLOCARBONATE COMPOUNDS AND POLYMERS AND COMPOSITIONS FORMED THEREFROM

(71) Applicant: The Sherwin-Williams Company, Cleveland, OH (US)

(72) Inventors: Sebastien Gibanel, Givry (FR); Benoit Prouvost, L'Abergement de Cuisery (FR)

(73) Assignee: The Sherwin-Williams Company, Cleveland, OH (US)

( * ) Notice: Subject to any disclaimer, the term of this patent is extended or adjusted under 35 U.S.C. 154(b) by 849 days.

(21) Appl. No.: 15/299,610

(22) Filed: Oct. 21, 2016

(65) Prior Publication Data

US 2017/0096579 A1    Apr. 6, 2017

Related U.S. Application Data

(63) Continuation of application No. PCT/US2015/027453, filed on Apr. 24, 2015.

(60) Provisional application No. 61/984,535, filed on Apr. 25, 2014.

(51) Int. Cl.
| | |
|---|---|
| C09D 171/00 | (2006.01) |
| C08G 65/40 | (2006.01) |
| B05D 7/22 | (2006.01) |
| B05D 1/12 | (2006.01) |
| B05D 1/02 | (2006.01) |
| C09D 179/02 | (2006.01) |
| B05D 7/14 | (2006.01) |
| B65D 1/12 | (2006.01) |
| B65D 25/14 | (2006.01) |
| C09D 5/08 | (2006.01) |
| C08G 73/02 | (2006.01) |
| C09D 175/04 | (2006.01) |

(52) U.S. Cl.
CPC ............ *C09D 171/00* (2013.01); *B05D 1/02* (2013.01); *B05D 7/14* (2013.01); *B05D 7/227* (2013.01); *B65D 1/12* (2013.01); *B65D 25/14* (2013.01); *C08G 65/40* (2013.01); *C09D 5/08* (2013.01); *C09D 179/02* (2013.01); *C08G 73/028* (2013.01); *C08G 2150/90* (2013.01); *C08G 2390/40* (2013.01); *C09D 175/04* (2013.01)

(58) Field of Classification Search
CPC ...... C09D 171/00; C09D 5/08; C09D 179/02; C09D 175/04; C08G 65/40; C08G 2390/40; C08G 2150/90; C08G 73/028; B05D 7/14; B05D 7/227; B05D 1/02; B65D 1/12; B65D 25/14
USPC .... 428/117, 418, 447, 461, 385.5, 178, 243, 428/294, 372.2, 475, 512; 427/385.5, 427/178, 243, 294, 372.2, 475, 512; 106/14.25
See application file for complete search history.

(56) References Cited

U.S. PATENT DOCUMENTS

| | | | |
|---|---|---|---|
| 2,448,767 | A | 9/1948 | Carlson et al. |
| 2,967,892 | A | 1/1961 | Smith |
| 2,987,555 | A | 6/1961 | Davis |
| 4,261,922 | A | 4/1981 | Kem |
| 4,341,905 | A | 7/1982 | Strege |
| 4,348,314 | A | 9/1982 | Lazarus et al. |
| 5,059,723 | A | 10/1991 | Dressler |
| 5,431,791 | A | 7/1995 | December et al. |
| 5,665,433 | A | 9/1997 | Moussa et al. |
| 5,714,568 | A | 2/1998 | Nava |
| 5,994,469 | A | 11/1999 | December |
| 8,129,495 | B2 | 3/2012 | Evans et al. |
| 8,633,327 | B2 | 1/2014 | Gulyas et al. |
| 8,741,988 | B2 | 6/2014 | Klopsch et al. |
| 2009/0036645 | A1 | 2/2009 | Stopek |
| 2009/0208553 | A1 | 8/2009 | Kemp et al. |
| 2012/0215020 | A1 | 8/2012 | Raether et al. |
| 2012/0215030 | A1 | 8/2012 | Raether |
| 2012/0264941 | A1 | 10/2012 | Jerome et al. |
| 2013/0206756 | A1 | 8/2013 | Niederst et al. |
| 2013/0316109 | A1 | 11/2013 | Niederst et al. |
| 2013/0323491 | A1* | 12/2013 | Takahashi ................ C08J 7/047 428/220 |
| 2014/0191156 | A1 | 7/2014 | Marks et al. |
| 2015/0021323 | A1 | 1/2015 | Niederst et al. |
| 2015/0110981 | A1 | 4/2015 | Dudik et al. |

FOREIGN PATENT DOCUMENTS

| | | |
|---|---|---|
| CA | 1303051 C | 6/1992 |
| CN | 1175288 A | 3/1998 |
| CN | 104559681 A | 4/2015 |
| EP | 1020457 A1 | 7/2000 |
| EP | 2679644 A1 | 1/2014 |

(Continued)

OTHER PUBLICATIONS

"Synthesis of glycerin carbonate-based intermediates using thiol-ene chemistry and isocyanate free polyhyroxyurethanes therefrom," Benyahya et al, Polymer Chemistry, 2011, 2, 2661.
International Search Report and Written Opinion for International Application No. PCT/US2015/027453, dated Aug. 11, 2015. 13 pages.
"Cyclic limonene dicarbonate as a new monomer for non-isocyanate oligo- and polyurethanes (NIPU) based upon terpenes." Bahr, et al., Green Chemistry, 2012, 14, 1447. 8 pages.
"Enantioselective Addition of 2-Methyl-3-butyn-2-ol to Aldehydes: Preparation of 3-Hydroxy-1-butynes," Boyall, et al., Organic Letters, 2000, vol. 2, No. 26, 4233-4236. 4 pages.

(Continued)

*Primary Examiner* — Gerard Higgins
*Assistant Examiner* — Kevin C Ortman, Jr.
(74) *Attorney, Agent, or Firm* — Honigman LLP

(57) ABSTRACT

Polycyclocarbonate compounds and upgraded molecular weight polymers made from such compounds are provided. The polymers have particular utility in coating compositions, especially for use on food and beverage contact substrates that are formed into or will be formed into containers or container components.

30 Claims, No Drawings

(56) References Cited

FOREIGN PATENT DOCUMENTS

| JP | 2012236925 A | 12/2012 |
|---|---|---|
| WO | 2011061452 A2 | 5/2011 |
| WO | 2013028292 A1 | 2/2013 |
| WO | 2013093346 A1 | 6/2013 |
| WO | 2015164692 A1 | 10/2015 |
| WO | 2015164703 A1 | 10/2015 |
| WO | 2007055929 A1 | 5/2017 |

OTHER PUBLICATIONS

"Reactive Applications of Cyclic Alkylene Carbonates," John H. Clements, American Chemical Society, Jan. 15, 2003. (12 pages).
"Carbonates for Non-Isocyanate Polyurethane," Q. Zheng et al., Specific Polymers, 2011, 6517-6527 (3 pages).
"Renewable polymides and plyurethanes derived from limonene," Firdaus et al, Green Chemistry, 2013, 15, 370-380. (12 pages).
Technical Bulletin, "Jeffsol Alkylene Carbonates, Synthesis of Hydroxyalkyl Urethanes," Huntsman Corporation, 2005. (4 pages).
"Carboxylative cyclization of propargylamines with supercritical carbon dioxide," Yoshihito Kayaki et al, Green Chemistry, 2006, 8, 1019-1021. (3 pages).
"Five-membered Cyclic Carbonates in the Synthesis of Tetramethacrylate Monomers with Low Oxygen Inhibition," Rokicki et al, Proceeding of the World Polymer Congress, Macro 2006, 41st International Symposium on Macromolecules. (2 pages).
"Hyperbranched Aliphatic Polyethers Obtained From Environmentally Benign Monomer: Glycerol Carbonate," Rokicki et al., The Royal Society of Chemistry 2005, Green Chemistry, 2005, 7, 529-539. (11 pages).
International Search Report and Written Opinion for International Application No. PCT/US2015/027438, dated Aug. 4, 2015, 10 pages.
Extended European Search Report for Application No. EP15783342. 7, dated Mar. 3, 2018, Munich.
Gabriel Rokicki, Jerzy Pawlicki, & Witold Kuran, "Poly(ether-carbonate)s from Diphenolates, Cyclic Carbonates, and Dihalo Compounds," Polymer Journal, Jun. 13, 1984, pp. 509-516, vol. 17, No. 3, Warsaw, Koszykowa 75, Poland.
Extended European Search Report for Application No. EP15783598. 4, dated Oct. 18, 2017, Munich.
Benjamin Schaffner, Matthis Blug, Daniela Kruse, Mykola Polyakov, Angela Kockritz, Andreas Martin, Prasanna Rajagopalan, Ursula Bentrup, Angelika Bruckner, Sebastian Jung, David Agar, Bettina Rungeler, Andreas Pfennig, Karsten Muller, Wolfgang Arlt, Benjamin Woldt, Michael Grab, & Stefan Buchholz, "Synthesis and Application of Carbonated Fatty Acid Esters from Carbon Dioxide Including a Life Cycle Analysis", ChemSusChem, Mar. 11, 2014, pp. 1133-1139, vol. 10.1002, Wiley Online Library, Weinheim, Germany.
Jens Langanke, Lasse Greiner, & Walter Leitner, "Substrate Dependent Synergetic and Antagonistic Interaction of Ammonium Halide and Polyoxometalate Catalysts in the Synthesis of Cyclic Carbonates from Oleochemical Epoxides and Co2", Green Chemistry, Feb. 11, 2013, pp. 1173-1182, vol. 15, RCS Publishing.
Patrik Toullec, Aranzazu Carbayo Martin, Monica Gio-Batta, Christian Bruneau, & Pierre Dixneuf, "Stereoselective Preparation of Z-Trisubstituted Alkylidene Cyclic Carbonates via Palladium-Catalyzed-Carbon Bond Formation", Pergamon, Jun. 1, 2000, pp. 5527-5531, vol. 41, Tetrahedron Letters, Rennes, France.
Supplementary Partial Search European Search Report for Application No. EP15783342, dated Sep. 29, 2017, Munich. Extended Search European Search Report for Application No. EP157833427, dated Mar. 3, 2018, Munich.

\* cited by examiner

POLYCYCLOCARBONATE COMPOUNDS AND POLYMERS AND COMPOSITIONS FORMED THEREFROM

CROSS-REFERENCE TO RELATED APPLICATION(S)

This application is a continuation of International Application No. PCT/US2015/027453, filed on Apr. 24, 2015 and entitled "POLYCARBONATE COMPOUNDS AND POLYMERS AND COMPOSITIONS FORMED THEREFROM", which claims the benefit of U.S. Provisional Application No. 61/984,535 filed, on Apr. 25, 2014 and entitled "POLYCARBONATE COMPOUNDS AND POLYMERS AND COMPOSITIONS FORMED THEREFROM", each of which is incorporated herein by reference in its entirety.

TECHNICAL FIELD

This invention relates to polycyclocarbonate compounds, to polymers made from such compounds, and to coating compositions formulated using such polymers.

BACKGROUND

The application of coatings to metals to retard or inhibit corrosion is well established. This is particularly true in the area of packaging containers such as metal food and beverage cans. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food and beverage containers to prevent corrosion in the headspace of the container between the fill line of the food product and the container lid.

Packaging coatings should preferably be capable of high-speed application to the substrate and provide the necessary properties when hardened to perform in this demanding end use. For example, the coating should be safe for food contact, not adversely affect the taste of the packaged food or beverage product, have excellent adhesion to the substrate, resist staining and other coating defects such as "popping," "blushing" and/or "blistering," and resist degradation over long periods of time, even when exposed to harsh environments. In addition, the coating should generally be capable of maintaining suitable film integrity during container fabrication and use and be capable of withstanding the processing conditions that the container may be subjected to during product packaging.

Various coatings have been used as interior protective can coatings, including polyvinyl-chloride-based coatings and epoxy-based coatings incorporating bisphenol A ("BPA"). Each of these coating types, however, has potential shortcomings. For example, the recycling of materials containing polyvinyl chloride or related halide-containing vinyl polymers can be problematic. There is also a desire by some to reduce or eliminate certain BPA-based compounds commonly used to formulate food-contact epoxy coatings.

What is needed in the marketplace is an improved binder system for use in coatings such as, for example, packaging coatings.

SUMMARY

In one aspect, the present disclosure is directed to polycyclocarbonate compounds (hereinafter "PCC" compound(s)) useful in forming polymers, which may have utility in various end uses including, for example, coating end uses such as packaging coating end uses. The PCC compounds can be saturated or unsaturated and preferably include at least two cyclocarbonate groups that each include a ring having a carbonate linkage (—O—C(=O)—O—) present in the ring. The carbonate-containing rings can be of any suitable ring size, although 5-member rings are preferred in some embodiments. In preferred embodiments, the PCC compound is a dicyclocarbonate compound.

In some embodiments, the PCC compound includes one or more cyclic groups other than cyclocarbonate groups (e.g., one or more groups selected from aryl or heteroaryl groups, alicyclic groups such as cyclobutane groups, and/or polycyclic groups).

In some embodiments, the PCC compound is derived from a polyepoxide such as, for example, a diepoxide of a polyacid or a polyol (or a compound having at least one acid group and at least one hydroxyl group) that includes one or more cyclic groups (e.g., aryl or heteroaryl groups, alicyclic groups, and/or polycyclic groups). In some such embodiments, the diepoxide is derived from a polyhydric phenol, more preferably a dihydric monophenol.

Preferred polymers of the present disclosure are suitable for use in a variety of end uses, including as a film-forming material of an adherent coating, and especially an adherent coating for a metal substrate. In some such embodiments, the polymer has a glass transition temperature ("Tg") of at least 40° C., more preferably at least 60° C., and a number average molecular weight of at least 1,000 or at least 2,000. In some embodiments, aryl or heteroaryl groups preferably constitute at least 25 weight percent of the polymer.

In yet another aspect, the present disclosure is directed to a coating composition that preferably includes a polymer formed from ingredients including the PCC compound and which can optionally include a liquid carrier. In some embodiments, the coating composition is suitable for use in forming an adherent coating suitable for use in food-contact applications. The coating composition preferably includes at least a film-forming amount of the disclosed polymer, which in some embodiments is a polyether polymer. In some embodiments, the polymer does not include any oxirane groups. In some embodiments, the polymer is free of any structural units derived from a bisphenol (e.g., bisphenol A, bisphenol F, bisphenol S, and the like) or a diepoxide thereof (e.g., a diglycidyl ether of bisphenol A, bisphenol F, or bisphenol S, and the like).

In yet another aspect, the present disclosure is directed to coated articles that include at least one surface having a coating formed from the coating composition of the present disclosure disposed thereon. In some embodiments, the coated articles are articles for packaging products such as, for example, food or beverage containers or portions thereof. In some embodiments, the coating composition is disposed on the interior of such containers as a food-contact coating.

In yet another aspect, the present disclosure is directed to a method for coating a substrate such as, for example, a metal substrate. In some embodiments, the method includes applying the coating composition (e.g., a liquid or powder coating composition) of the present disclosure to a substrate prior to or after forming the substrate into an article such as a packaging article (e.g., a container such as a metal food or beverage container) or a portion thereof.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list. Unless otherwise indicated, the structural representations included herein are not intended to indicate any particular stereochemistry and are intended to encompass all stereoisomers.

DEFINITIONS

As used herein, "a," "an," "the," "at least one," and "one or more" are used interchangeably. Thus, for example, a coating composition that comprises "a" polyether can be interpreted to mean that the coating composition includes "one or more" polyethers.

The terms "comprises" and variations thereof do not have a limiting meaning where these terms appear in the description and claims.

The term "crosslinker" refers to a molecule capable of forming a covalent linkage between separate polymers or between two different regions of the same polymer.

The terms "estrogenic activity" or "estrogenic agonist activity" refer to the ability of a compound to mimic hormone-like activity through interaction with an endogenous estrogen receptor, typically an endogenous human estrogen receptor.

The term "mobile" when used with respect to a compound in a coating composition means that the compound can be extracted from the coating composition when a cured coating (typically ~1 mg/cm$^2$) is exposed to a test medium for some defined set of conditions, depending on the end use. An example of these testing conditions is exposure of the cured coating to HPLC-grade acetonitrile for 24 hours at 25° C.

The term "on," when used in the context of a coating applied on a surface or substrate, includes both coatings applied directly or indirectly to the surface or substrate. Thus for example, a coating applied to a primer layer overlying a substrate constitutes a coating applied on the substrate.

The term "organic group" means a hydrocarbon group (with optional elements other than carbon and hydrogen, such as oxygen, nitrogen, sulfur, and silicon) that may be further classified as an aliphatic group, cyclic group (e.g., aromatic and cycloaliphatic groups), or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group (e.g., an n-propyl isopropyl group). The term "alkenyl group" means an unsaturated, linear or branched hydrocarbon group with one or more carbon-carbon double bonds (e.g., a vinyl group). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. A group that may be the same as or different from other groups may be referred to as being "independently" something. Substitution on the organic groups of compounds of the present invention is contemplated. The terms "group" and "moiety" may be used to differentiate between chemical species that allow for substitution or that may be substituted and those that do not allow or may not be so substituted. The term "group" is intended to be a recitation of both the particular moiety, as well as a recitation of the broader class of substituted and unsubstituted structures that includes the moiety. Thus, when the term "group" is used to describe a chemical substituent, the described chemical material includes the unsubstituted group (e.g., the moiety) and that group with 0, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, isopropyl, t-butyl, heptyl, dodecyl, octadecyl, amyl, 2-ethylhexyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, isopropyl, t-butyl, heptyl, dodecyl, octadecyl, amyl, 2-ethylhexyl, and the like.

The term "unsaturated" when used in the context of a compound refers to a compound that includes at least one non-aromatic (e.g., aliphatic) carbon-carbon double or triple bond.

The term "polyhydric phenol" as used herein refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

The term "polyhydric monophenol" refers to a polyhydric phenol that (i) includes an aryl or heteroaryl group (more typically a phenylene group) having at least two hydroxyl groups attached to the aryl or heteroaryl ring and (ii) does not include any other aryl or heteroaryl rings having a hydroxyl group attached to the ring. The term "dihydric monophenol" refers to a polyhydric monophenol that only includes two hydroxyl groups attached to the aryl or heteroaryl ring.

The term "polyhydric polyphenol" (which includes bisphenols) refers to a polyhydric phenol that includes two or more aryl or heteroaryl groups each having at least one hydroxyl group attached to the aryl or heteroaryl ring.

The term "bisphenol" refers to a polyhydric polyphenol having two phenylene groups that each include six-carbon rings and a hydroxyl group attached to a carbon atom of the ring, wherein the rings of the two phenylene groups do not share any atoms in common.

The term "phenylene" as used herein refers to a six-carbon atom aryl ring (e.g., as in a benzene group) that can have any substituent groups (including, e.g., hydrogen atoms, halogen atoms, hydrocarbon groups, oxygen atoms, hydroxyl groups, etc.). Thus, for example, the following aryl groups are each phenylene rings: —C$_6$H$_4$—, —C$_6$H$_3$(CH$_3$)—, and —C$_6$H(CH$_3$)$_2$Cl—. In addition, for example, each of the aryl rings of a naphthalene group are phenylene rings.

The terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

The term "substantially free" when used with respect to a coating composition that may contain a particular mobile compound means that the coating composition contains less than 1,000 parts per million (ppm) of the recited mobile compound. The term "essentially free" when used with respect to a coating composition that may contain a particular mobile compound means that the coating composition contains less than 100 parts per million (ppm) of the recited mobile compound. The term "essentially completely free" when used with respect to a coating composition that may contain a particular mobile compound means that the coating composition contains less than 5 parts per million (ppm) of the recited mobile compound. The term "completely free" when used with respect to a coating composition that may contain a particular mobile compound means that the coating composition contains less than 20 parts per billion (ppb) of the recited mobile compound. If the aforementioned phrases are used without the term "mobile" (e.g., "substantially free of BPA compound") then the compositions of the present invention contain less than the aforementioned amount of the compound whether the compound is mobile in the coating or bound to a constituent of the coating.

When the phrases "does not include any," "free of" (outside the context of the phrases in the preceding paragraph), and the like are used herein, such phrases are not intended to preclude the presence of trace amounts of the pertinent structure or compound which may be present due to environmental contaminants.

Unless otherwise indicated, the term "polymer" includes both homopolymers and copolymers (e.g., polymers of two or more different monomers). Similarly, unless otherwise indicated, the use of a term designating a polymer class such as, for example, "polyether" is intended to include both homopolymers and copolymers (e.g., polyether-ester copolymers).

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION

In one aspect, the present disclosure provides a coating composition that includes a polymer, more preferably a binder polymer, and even more preferably a polyether binder polymer. Although the following discussion focuses primarily on coating end uses, it is contemplated that the disclosed polymer, as well as intermediates thereof, may have utility in a variety of other end uses such as, for example, in adhesives or composites.

The disclosed coating compositions preferably include at least a film-forming amount of the polymer described herein. In addition to the polymer, the coating composition may also include one or more additional ingredients such as, for example, a crosslinker, a liquid carrier, and any other suitable optional additives. Although any suitable cure mechanism may be used, thermoset coating compositions are preferred. Moreover, although coating compositions including a liquid carrier are presently preferred, it is contemplated the disclosed polymers may have utility in solid coating application techniques such as, for example, powder coating, laminate coatings, etc.

The coating compositions may have utility in a variety of end uses, including packaging coating end uses. Other coating end uses may include industrial coatings, marine coatings (e.g., for ship hulls), coatings for storage tanks (e.g., metal or concrete), architectural coatings (e.g., on cladding, metal roofing, ceilings, garage doors, etc.), coatings for gardening tools and equipment, toy coatings, automotive coatings, metal furniture coatings, coil coatings for household appliances, floor coatings, and the like.

In preferred embodiments, the coating composition is suitable for use as an adherent packaging coating and, more preferably, as an adherent coating on an interior and/or exterior surface of a food or beverage container. Thus, in preferred embodiments, the coating composition is suitable for use as a food-contact coating. It is also contemplated that the coating composition may have utility in cosmetic packaging or medical packaging coating end uses, and as a drug-contact coating in particular (e.g., as an interior coating of a metered dose inhaler can—commonly referred to as an "MDI" container). It is also contemplated that the coating composition may have utility in coating applications in which the coated substrate will contact bodily fluids such as, e.g., as an interior coating of a blood vial.

As discussed in detail later herein, the polymers disclosed herein are preferably formed from ingredients that include a polycyclocarbonate ("PCC") compound. Any suitable PCC compound or combination of PCC compounds may be employed, with dicyclocarbonate compounds being preferred in certain embodiments.

The polymer may have any suitable backbone chemistry and may be a linear or branched polymer. In preferred embodiments, however, the polymer is a linear or substantially linear polymer. Typically, the backbone will include one or more heteroatoms (e.g., O, N, or S), and more typically a plurality of heteroatoms.

In certain preferred embodiments, the polymer is a polyether polymer that preferably includes a plurality of ether linkages in its backbone. If desired, the backbone of the polymer may include linkages having one or more heteroatoms (e.g., step-growth or condensation linkages) other than ether linkages (e.g., in addition to, or in place of, the ether linkages) such as, for example, amide linkages, carbonate linkages, ester linkages, urea linkages, urethane linkages, or sulfur-containing linkage (e.g., carbon-sulfur chain linkages) and the like, or combinations thereof. Thus, for example, in some embodiments, the backbone may include both ester and ether linkages. In some embodiments, the polymer is a polyether polymer that is free of backbone condensation linkages or step-growth linkages other than ether linkages. In one embodiment, the polymer is free of backbone ester linkages.

The polymer preferably includes hydroxyl groups. More preferably, the polymer includes a plurality of hydroxyl groups attached to the backbone. In preferred embodiments, the polymer backbone includes secondary hydroxyl groups distributed throughout. Preferred secondary hydroxyl groups are present in —$CH_2$—$CH(OH)$—$CH_2$— or —$CH_2$—$CH_2$—$CH(OH)$— segments. Such segments may be formed, for example, via reaction of a cyclocarbonate group and a hydroxyl group (e.g., a hydroxyl group of a polyhydric phenol), an acid group, or an amino group. In some embodiments, —$CH_2$—$CH(OH)$—$CH_2$— or —$CH_2$—$CH_2$—$CH(OH)$— segments are attached to each of the oxygen atoms of the segments of Formula (I), which is discussed later herein.

The backbone of the polymer may include any suitable terminal groups, including, for example, one or more acid groups, one or more hydroxyl groups, and/or one or more cyclocarbonate groups.

The disclosed polymers can have any suitable glass transition temperature ("Tg"). As discussed above, in certain preferred embodiments, the coating composition disclosed herein is suitable for use in forming a food-contact packaging coating. To exhibit a suitable balance of coating properties for use as a food-contact packaging coating, including suitable corrosion resistance when in prolonged contact with packaged food or beverage products which may be of a corrosive nature, in some embodiments, the disclosed polymer preferably has a Tg of at least 40° C., more preferably at least 50° C., and even more preferably at least 60° C. or at least 70° C. In preferred such embodiments, the Tg is less than 150° C., more preferably less than 130° C., and even more preferably less than 110° C. Tg can be measured via differential scanning calorimetry ("DSC"). In preferred embodiments, the polymer is a polyether polymer exhibiting a Tg pursuant to the aforementioned Tg values.

It is contemplated that, in some embodiments, such as, for example, where the coating composition is intended for use as an exterior varnish on a food or beverage container, the Tg of the polymer may be less than that described above (e.g., as low as about 30° C.) and the coating composition may still exhibit a suitable balance of properties in the end use.

When the Tg of a polymer is referenced herein in the context of a coating composition including the polymer or a coated article coated with such a coating composition, the indicated Tg values for the polymer refers to the Tg of the polymer prior to any cure of a coating composition including the polymer.

While not intending to be bound by any theory, when a "high" Tg polymer is desired, the desired Tg may be achieved, for example, by selecting a suitable amount of one or more monomers that tend to yield a higher Tg polymer. Examples of such monomers may include certain monomers having one or more aryl or heteroaryl groups, one or more polycyclic groups, and/or one or more alicyclic groups such as, e.g., cyclobutane groups.

While not intending to be bound by any theory, it is believed that the inclusion of a sufficient number of aryl and/or heteroaryl groups (typically phenylene groups) in the polymer is an important factor for achieving suitable coating performance for food-contact packaging coatings, especially when the product to be packaged is a so called "hard-to-hold" food or beverage product. Sauerkraut is an example of a hard-to-hold product. In preferred embodiments, aryl and/or heteroaryl groups constitute at least about 10 weight percent ("wt-%"), more preferably at least about 25 wt-%, and even more preferably at least about 35 wt-% or at least about 45 wt-% of the polymer, based on the total weight of aryl and heteroaryl groups in the polymer relative to the weight of the polymer. The upper concentration of aryl/heteroaryl groups is not particularly limited, but preferably the amount of such groups is configured such that the Tg of the polymer is within the Tg ranges previously discussed. The total amount of aryl and/or heteroaryl groups in the polymer will typically constitute less than about 80 wt-%, more typically less than about 75 wt-%, and even more typically less than about 70 wt-% or less than about 60 wt-% of the polymer. The total amount of aryl and/or heteroaryl groups in the polymer can be determined based on the weight of aryl- or heteroaryl-containing monomer incorporated into the polymer and the weight fraction of such monomer(s) that constitutes aryl or heteroaryl groups.

In embodiments where the polymer is a copolymer (e.g., a polyether-acrylic copolymer in which the polyether polymer portion includes segments derived from the PCC compound), the weight fraction of aryl or heteroaryl groups in the polymer portion(s) including segments derived from the PCC compound will generally be as described above, although the weight fraction relative to the total weight of the copolymer may be less. Thus, in preferred embodiments, the polyether fraction of the polymer includes an amount of phenylene groups pursuant to the amounts recited above.

Preferred aryl or heteroaryl groups include less than 20 carbon atoms, more preferably less than 11 carbon atoms, and even more preferably less than 8 carbon atoms. The aryl or heteroaryl groups preferably have at least 4 carbon atoms, more preferably at least 5 carbon atoms, and even more preferably at least 6 carbon atoms. Substituted or unsubstituted phenylene groups are preferred aryl or heteroaryl groups. Thus, in preferred embodiments, the polymer includes an amount of phenylene groups pursuant to the amounts recited above.

In preferred embodiments, cyclic groups constitute at least 10 wt-%, more preferably at least 25 wt-%, even more preferably at least 35 wt-% or 45 wt-% of the polymer, based on the total weight of cyclic groups in the polymer relative to the weight of the polymer. The total amount of cyclic groups in the polymer can be determined based on the weight of cyclic-group-containing monomer incorporated into the polymer and the weight fraction of such monomer(s) that constitutes cyclic groups.

In preferred embodiments, the polymer includes one or more segments of the below Formula (I):

$$\text{—O-Ar-(R}_f\text{-Ar)}_t\text{-O—} \qquad \text{Formula (I)}$$

wherein:
each Ar is independently an aryl group (e.g., an arylene group) or heteroaryl group (e.g., heteroarylene group);
each t is independently 0 or 1; and
R, if present, is a divalent organic group.

In Formula I, each Ar preferably has less than 20 carbon atoms, more preferably less than 11 carbon atoms, and even more preferably less than 8 carbon atoms. Preferably, each Ar has at least 4 carbon atoms, more preferably at least 5 carbon atoms, and even more preferably at least 6 carbon atoms. In certain embodiments, each Ar is a phenylene group. In certain embodiments, each Ar is a phenylene group of the formula $—C_6(R^1)_4—$, wherein each $R^1$ is independently hydrogen, a halogen, an organic group, or any other suitable group preferably having an atomic mass greater than 15 Daltons, and wherein two $R^1$ groups can join to form an organic ring that can optionally contain one or more heteroatoms. In some embodiments, each $R^1$ is hydrogen.

In some embodiments, one or both of the oxygen atoms depicted in Formula (I) is an ether oxygen atom (as opposed, e.g., to an oxygen of an ester linkage).

In some embodiments, one or both of a PCC compound and an extender used to form the polymer include a segment of Formula (I).

As discussed above, the polymer is preferably formed using ingredients that include a PCC compound. Any suitable PCC compound may be used, with dicyclocarbonate compounds being preferred. The PCC compounds can include carbonate-containing rings of any suitable ring size. Suitable such ring sizes may include 5 atom rings, 6 atom ring, 7 atom rings, 8 atom rings, 9 atom rings, or rings containing 10 or more atom rings (e.g., up 15 atoms rings).

More typically, the carbonate-containing rings will contain from 5 to 6 atoms in the ring, with 5 atom rings being preferred in some embodiments.

In some embodiments, the PCC compound includes at least one or two or more step-growth linkages. Examples of such step-growth linkages may include amide linkages, carbonate linkages, ester linkages, urea linkages, and/or urethane linkages. In some embodiments, the PCC compound includes two or more ether linkages. In some embodiments, the PCC compound includes one or more sulfur-containing linkages (e.g., carbon-sulfur chain linkages).

The PCC compounds can be of any suitable molecular weight. Typically, however, the PCC compounds will have a molecular weight of less than 2,000 Daltons, more typically less than 1,000 Daltons. In some embodiments, the PCC compounds have a molecular weight of less than 500, less than 400, less than 300, or less than 200 Daltons. Theoretical molar mass in Daltons is a convenient measure of molecular weight for a given PCC compound.

In preferred embodiments, the PCC compound has a structure of the below Formula (II):

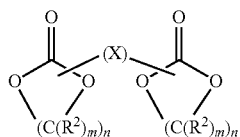

Formula (II)

wherein:
X is a divalent group;
each $R^2$ is independently hydrogen, oxygen, a halogen, a carbon-containing group, a sulfur-containing group, an oxygen-containing group, a nitrogen-containing group, or a phosphorus-containing group;
each n is independently 2 to 13, more preferably 2 or 3;
each m is independently 0 to 2, with the proviso that m is 0 or 1 for at least one —$C(R^2)_m$— group of each depicted cyclocarbonate group to allow for connection of the cyclocarbonate group to X; and
one or more $R^2$ may optionally join with another $R^2$ and/or X to form a cyclic group.

X can be any suitable divalent group including, for example, carbon-containing groups (which may optionally include heteroatoms such as, e.g., N, O, P, S, Si, a halogen atom, etc.), sulfur-containing groups (including, e.g., a sulfur atom, a sulfinyl group (—S(O)—), a sulfonyl group (—S(O$_2$)—), a sulfide group, etc.), oxygen-containing groups (including, e.g., an oxygen atom, a ketone group, a carbonate group, an ester group, an ether group, etc.), nitrogen-containing groups, or a combination thereof. X preferably includes at least one carbon atom and more preferably at least two carbon atoms. In some embodiments, X does not include any heteroatoms or does not include any heteroatoms in a carbon-chain connecting the two depicted cyclocarbonate groups.

In some embodiments, X includes one or more linkages including a heteroatom (typically step growth linkages) such as, for example, one or more ether linkages (e.g., a pair of ether linkages), one or more sulfur-containing linkages (e.g., a pair of sulfur linkages), one or more amide linkages (e.g., a pair of amide linkages), or one or more ester linkages (e.g., a pair of ester linkages).

In preferred embodiments, X is present and is typically an organic group that contains from 1 to about 50, from 1 to about 20, from 1 to about 10, or from 1 to 6 carbon atoms.

In some embodiments, X of Formula (II) includes one or more cyclic groups (e.g. 2 or more, 3 or more, 4 or more, etc.), which may be aromatic or alicyclic and can optionally include heteroatoms. The cyclic groups may be monocyclic or polycyclic (e.g., bicyclic or tricyclic or higher). The one or more optional cyclic groups of X can be present, for example, (i) in a chain connecting the two cyclocarbonate groups depicted in Formula (II), (ii) in a pendant group attached to a chain connecting the two cyclocarbonate groups, or both (i) and (ii).

In some embodiments, X includes one or more aryl or heteroaryl groups, with phenylene groups being preferred in certain embodiments. In other embodiments, X includes one or more saturated or unsaturated alicyclic groups. Suitable such alicyclic groups may include 4-member rings (e.g., cyclobutane or cyclobutene groups), 5-member rings (e.g., cyclopentane, cyclopentene, or cyclopentadiene groups), 6-member rings (e.g., cyclohexane, cyclohexene, or cyclohexadiene groups), 7-member rings (e.g., cycloheptane, cycloheptene, cycloheptadiene groups), or rings with 8 or more members in the ring. Such alicyclic groups may include one or more heteroatoms in the ring (e.g., N, O, S, P, etc.) and may include one or more substituents attached to the ring in place of hydrogen. Thus, for example, X may include a alicyclic-group-containing structural unit derived from a cyclobutanediol (e.g., 2,2,4,4-tetramethyl-1,3-cyclobutanediol), isosorbide, isoiodide, isomannide, a tricyclodecane dimethanol, a tricyclodecane diamine, a cyclohexane dicarboxylic acid, or a cyclohexanedimethanol.

While it is contemplated that X and/or $R^2$ can include a halogen atom, in preferred embodiments, the PCC compound of Formula (II) is free of halogen atoms.

Although m can be 0 or 1, typically m will be 2. Some examples in which m is 0 or 1 for a given —$C(R^2)_m$— group include: (a) when $R^2$ is an oxygen atom attached via a double bond to the depicted carbon atom of the —$C(R^2)_m$— group, (b) when $R^2$ includes a carbon atom that is attached via a double bond to the depicted carbon atom of the —$C(R^2)_m$— group, and (c) when the $C(R^2)_m$— group is attached to an adjacent —$C(R^2)_m$— group via a carbon-carbon double bond or a carbon-carbon triple bond. For each depicted cyclocarbonate group in Formula (II), m will be 0 or 1 for at least one —$C(R^2)_m$— group to allow for connection of the cyclocarbonate group to X.

As discussed above, one or more $R^2$ may join with another $R^2$ and/or X. An example of such a compound of Formula (II) is limonene dicarbonate, which is depicted below.

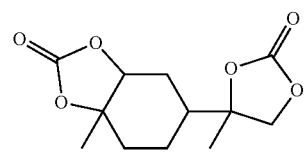 [SMILES: CC1(C2CCC3(C)OC(=O)OC3C2)COC(=O)O1]

In some embodiments, n is 2. Such a PCC compound of Formula (II) is depicted in the below Formula (III).

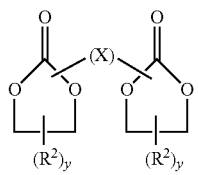

Formula (III)

wherein X and $R^2$ are as described above for Formula (II) and y is 1 to 3.

In one embodiment, y is 3, X is attached to a carbon atom of each depicted cyclocarbonate group via a single bond (as opposed to a double bond), and each $R^2$ is independently a hydrogen or an organic group.

In another embodiment, y is 1 or 2 and each depicted cyclocarbonate group includes an $R^2$ group that is attached to the ring via a carbon-carbon double bond. An example of such a Formula (III) compound is the PCC compound of Example 1.

In some embodiments, the PCC compound is derived from a polyepoxide and more preferably a diepoxide. The oxirane groups of a polyepoxide can be converted to cyclocarbonate groups via carbonation reactions known to those of skill in the art. The polyepoxide reactant may optionally be derived from a compound having two or more functional groups (e.g., acid or hydroxyl) that can be reacted with a compound such as a halohydrin (e.g., epichlorohydrin) to produce a polyepoxide, and more preferably a diepoxide such as a diglycidyl ether or a diglycidyl ester compound. In certain preferred embodiments, the polyepoxide includes one or more of the cyclic groups discussed herein. Any suitable diol or diacid (e.g., cyclic-group containing diols or diacids) can be used in making the diepoxide, with polyhydric phenols and particularly polyhydric monophenols being preferred in certain embodiments. To further illustrate the production of PCC compounds from polyepoxides, below is a reaction scheme illustrating the conversion of resorcinol, which is a polyhydric monophenol, into a diepoxide via reaction with epichlorohydrin followed by carbonation of the resulting diepoxide to form a dicyclocarbonate compound. The below reaction scheme also exemplifies a process for producing a PCC compound that includes a segment of Formula (I).

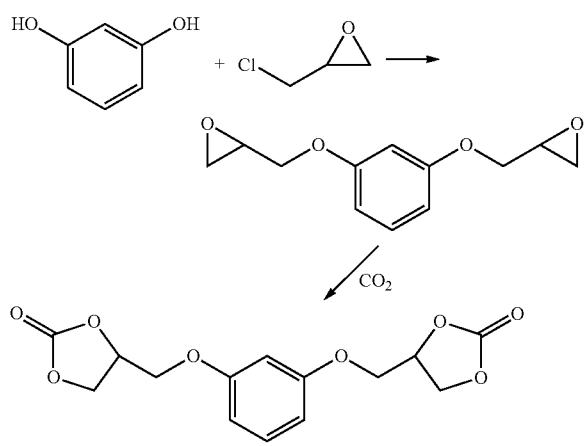

Any of the divinylarene dioxide structures disclosed in U.S. Pat. No. 8,633,327 may be used as a diepoxide for purposes of forming a dicyclocarbonate compound for use in making the disclosed polymer. The below Formula (IV) compound illustrates some suitable such divinylarene dioxide structures.

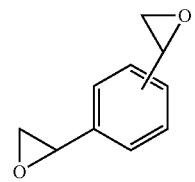

Formula (IV)

The synthesis of dicyclocarbonate compounds from divinylarene dioxide compound of Formula (IV) is discussed in International App. Pub. No. WO2013/028292.

The PCC compound may also be produced by reacting a first compound including at least two carbonyl functional groups (e.g., a diketone or a dialdehyde) with a second compound having a carbon-carbon triple bond to produce an adduct, which can be reacted with carbon dioxide to yield a PCC compound. This method, and PCC compounds resulting therefrom, are described in the U.S. Provisional Application No. 61/984,523 filed on even date herewith by Gibanel et al. and entitled "Polycyclocarbonate Compounds and Polymers Formed Therefrom" (Attorney Docket No. 06-2247-0100). Such a reaction scheme is illustrated below for a generic diketone as the first compound and acetylene as the second compound.

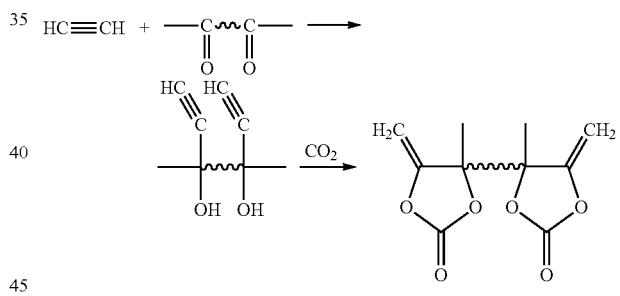

Other synthesis routes for producing PCC compounds will be readily apparent to those of skill in the art. For example, Benyahya et al., *Polymer Chemistry*, 2011, 2, 2661, describes various synthesis routes for obtaining dicyclocarbonate compounds, including via a thiol-ene coupling reaction involving, e.g., (i) a cyclocarbonate compound having an unsaturated substituent group attached to the cyclocarbonate compound (e.g., vinylidene carbonate, glycerine carbonate allyl ether, etc.) and (ii) a disulfide compound (e.g., thiodiglycol). Two exemplary dicyclocarbonate compounds that can be produced using such a method are provided below.

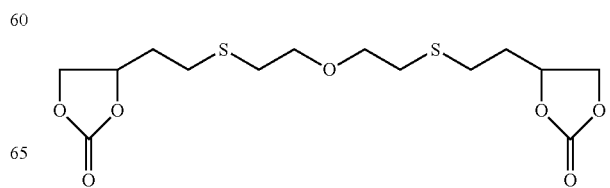

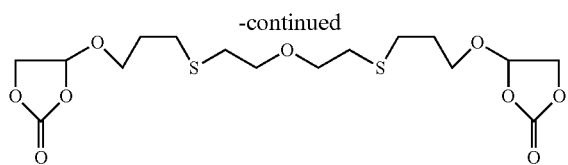

The disclosed PCC compounds provide useful raw or starting materials for preparation of a variety of polymers (e.g., homopolymers and copolymers), which may be branched or linear. The PCC compound may be reacted with any suitable extender or combination of extenders to achieve a polymer having the desired molecular weight and structure. For example, the PCC compound (e.g., compounds of Formulas II or III) may be reacted with a polyfunctional extender compound having two or more functional groups that are reactive with cyclocarbonate functional groups, with difunctional extender compounds being preferred. (By "difunctional" it is meant that the extender only includes two functional groups that are reactive with cyclocarbonate groups under the desired reaction conditions.) Conditions for such reactions are generally carried out using standard techniques that are known to one of skill in the art or that are exemplified in the examples section. Examples of suitable polyfunctional extender compounds include polyhydric phenols, polyamines (e.g., dicyclohexyl amine, diethylene triamine, neopentylamine, etc.), polyamidoamines (e.g., adducts of amino terminal dimer fatty acid and ethylene diamine, hexamethylene diamine, etc.), compounds containing a phenol group and an amino group such as hydroxyphenol amines (e.g., catechol amine, dopamine, tyramine, octopamine, etc.), and variants and mixtures thereof. Preferred such extenders include diphenols, diamines, and diamidoamines.

In some embodiments, the extenders may include any of the cyclic groups described herein. For example, in some embodiments, the extenders preferably include one or more aryl or heteroaryl groups, with substituted or unsubstituted phenylene groups being preferred examples of such groups. In other embodiments, the extenders may include one or more saturated or unsaturated cycloaliphatic groups such as, for example, any of those previously described herein.

Suitable polyhydric phenols include hindered diphenols (for example, 4,4'-methylenebis(2,6-dimethylphenol)) as described in U.S. application Ser. No. 13/570,743 (Niederst et al. '743, now published as US 2013/0316109); nonsubstituted diphenols that are appreciably non-estrogenic (for example, 4,4'-(1,4-phenylenebis(propane-2,2-diyl))diphenol and 2,2'methylenebis(phenol)) as also described in Niederst et al. '743; diphenols such as those described (for example, the bis-4-hydroxybenzoate of cyclohexanedimethanol) in U.S. Pat. No. 8,129,495 B2 (Evans et al. '495); and the dihydric monophenol compounds of Formula (V) shown below:

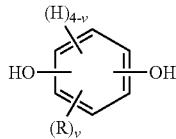

Formula (V)

wherein:
each R, if present, is independently an atom or group preferably having at atomic weight of at least 15 Daltons;
v is 0 to 4; and
two or more R groups can optionally join to form one or more cyclic groups.

Exemplary dihydric monophenol compounds of Formula (V) include catechol and substituted catechols (e.g., 3-methylcatechol, 4-methylcatechol, 4-tert-butyl catechol, and the like); hydroquinone and substituted hydroquinones (e.g., methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquinone, 2,5-di-tert-butylhydroquinone, and the like); resorcinol and substituted resorcinols (e.g., 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butylresorcinol, and the like); and variants and mixtures thereof. Additional suitable dihydric monophenol compounds are disclosed in U.S. Patent Application Publication No. US 2013/0206756 A1 (Niederst et al. '756) and International Application No. WO 2013/119686 A1 (Niederst et al. '686).

The one or more extender compounds can be of any suitable molecular weight. Typically, however, an extender compound will have a molecular weight of less than 2,000 Daltons, more typically less than 1,000 Daltons. In some embodiments, the extender compounds have a molecular weight of less than 500, less than 400, less than 300, or less than 200 Daltons. Theoretical molar mass in Daltons is a convenient measure of molecular weight for a given extender compound.

If desired, one or more additional comonomers or co-oligomers may also be included with the reactants used to generate the disclosed polymers such as, e.g., diacid monomers. The comonomers or co-oligomers may, for example, be included in an initial reaction mixture of PCC compound and extender(s) or may be post-reacted with the resulting oligomer or polymer. In presently preferred embodiments, such additional comonomers or co-oligomers are not utilized to produce the disclosed polymers.

Molecular weight advancement may be enhanced by the use of a suitable catalyst in an amount sufficient to facilitate the desired reaction. Examples of suitable catalysts may include phosphines, aliphatic or cycloaliphatic amines, and combinations thereof.

The type of polymer backbone included in the disclosed polymer will vary depending upon the extender or extenders chosen and any other co-reactants (e.g., co-monomers), if any, used in making the polymer. Thus, for example, the polymer may be a polyether, a polycarbamate, a polyester, or a copolymer of any of these polymer types.

In preferred embodiments, the disclosed polymer includes a plurality of segments derived from the PCC compound described herein (e.g., the PCC compound of Formulas (II) or (III)), which are preferably dispersed throughout a backbone of the polymer, more preferably a polyether backbone. In preferred embodiments, the segments derived from the PCC compound (hereinafter "PCC segments") constitute a substantial portion of the overall mass of the polymer. Typically, the PCC segments constitute at least 10 weight percent ("wt-%"), preferably at least 30 wt-%, more preferably at least 40 wt-%, even more preferably at least 50 wt-%, and optimally at least 55 wt-% of the polymer.

In some embodiments, the weight percent of the PCC segments in the polymer may be below the amounts recited above, and can even be substantially below. By way of example, the concentration of PCC segments may be outside the ranges recited above if the polymer includes large molecular weight additional components such as may occur, for example, when the polymer is a copolymer such as an acrylic-containing copolymer (e.g., an acrylic-polyether copolymer formed by grafting acrylic onto a polyether polymer of the present disclosure).

Preferred polymers of the present disclosure may be made in a variety of molecular weights. Preferred polymers have a number average molecular weight (Mn) of at least 2,000, more preferably at least 3,000, and even more preferably at least 4,000. The molecular weight of the polymer may be as high as is needed for the desired application. Typically, however, the Mn of the polymer, when adapted for use in a liquid coating composition, will not exceed about 11,000. In some embodiments, the polymer has a Mn of about 5,000 to about 8,000. In embodiments where the polymer is a copolymer, such as for example a polyether-acrylic copolymer, the molecular weight of the overall polymer may be higher than that recited above, although the molecular weight of the polyether polymer portion will typically be as described above. Typically, however, such copolymers will have a Mn of less than about 20,000.

The disclosed polymer may exhibit any suitable polydispersity index (PDI). In embodiments in which the polymer is intended for use as a binder polymer of a liquid applied packaging coating (e.g., a food or beverage can coating), the polymer will typically exhibit a PDI of from about 1.5 to 5, more typically from about 2 to 3.5, and in some instances from about 2.2 to 3 or from about 2.4 to 2.8.

In some embodiments, the disclosed polymer does not include any oxirane groups. The absence of oxirane groups may be attributable to the polymer being formed using ingredients that do not include oxirane groups. Alternatively, the polymer may be formed from ingredients that contain oxirane groups, but using a process, in which the oxirane groups are consumed and not present in the final polymer.

In certain preferred embodiments, the disclosed polymer does not include any structural units derived from a bisphenol monomer. By avoiding the inclusion of any bisphenol monomers in the materials used to make preferred polymers, there is no potential for any residual unreacted bisphenol monomer to be present in a composition containing the polymer. Bisphenol monomers typically have a molecular weight of less than 500 Daltons, more typically less than 400 Daltons, even more typically less than 350 Daltons, etc. Examples of bisphenol monomers include bisphenol A, bisphenol AP, bisphenol AF, bisphenol B, bisphenol BP, bisphenol C, bisphenol E, bisphenol F, bisphenol G, bisphenol I, bisphenol M, bisphenol P, bisphenol PH, bisphenol S, bisphenol TMC, bisphenol Z, 4,4'-(propane-2,2-diyl)bis(2,6-dibromophenol), 2,2-bis(4-hydroxyphenyl)propanoic acid, and the like. Bisphenol monomers are typically synthesized via reaction of a phenol compound with a ketone (e.g., formaldehyde, acetalaldehyde, acetone, cyclohexanone, acetophenone, etc.). Bisphenol A, for example, is synthesized via reaction of two equivalents of phenol with one equivalent of acetone.

The term "bisphenol monomer" as used herein does not include adducts of dihydric monophenols and linking compounds such as diacids or diepoxides that do not include any structural units derived from a bisphenol monomer. Thus, for example, a polyether polymer formed via reaction of the following ingredients is considered free of structural units derived from a bisphenol monomer: (i) a dicyclocarbonate compound derived from the diglycidyl ether of tert-butyl-hydroquinone and (ii) an adduct of two equivalents of hydroquinone reacted with one equivalent of 1,4 cyclohexanedimethanol diglycidyl ether ("CHDMDGE").

In some embodiments, the disclosed polymer does not include any structural units derived from a polyhydric polyphenol monomer.

In some embodiments, the disclosed polymer does not include any halogen atoms.

The disclosed upgraded molecular weight polymers may be applied to a variety of substrates as liquid or powder-based coating compositions. Liquid coating compositions (typically including the polymer and a liquid carrier) may be preferred for many end uses, especially for use on heat-sensitive substrates or for substrates where an especially thin coating is desired. Exemplary liquid carriers include water, organic solvents, and mixtures of liquid carriers. Exemplary organic solvents include glycol ethers, alcohols, aromatic or aliphatic hydrocarbons, dibasic esters, ketones, esters, and the like. Preferably, such carriers are selected to provide a dispersion or solution of the polymer with which additional additives may be combined to provide a final coating formulation.

In one embodiment, the disclosed liquid coating compositions are solvent-based systems that include no more than a de minimus amount of water (e.g., less than 2 wt-% of water). The disclosed solvent-based liquid coating compositions may, for example, contain at least 20 wt-% non-volatile components (viz., "solids"), and more preferably at least 25 wt-% non-volatile components. The disclosed solvent-based liquid coating compositions may also, for example, contain no greater than 50 wt-% non-volatile components or no greater than 40 wt-% non-volatile components.

In one embodiment, the coating composition is a water-based composition preferably having at least 15 wt-% non-volatile components. In one embodiment, the coating composition is a water-based composition preferably having no greater than 50 wt-% non-volatile components, and more preferably no greater than 40 wt-% non-volatile components. Water-based coating systems of the present disclosure may optionally include one or more organic solvents, which will typically be selected to be miscible in water. The liquid carrier system of water-based coating compositions will typically include at least 50 wt-% of water, more typically at least 75 wt-% of water, and in some embodiments more than 90 wt-% or 95 wt-% of water. Any suitable means may be used to render the disclosed polymers miscible in water. For example, the polymers may include a suitable amount of salt groups such as ionic or cationic salt groups to render the polymers miscible in water (or groups capable of forming such salt groups). Neutralized acid or base groups are preferred salt groups.

The disclosed polymers may serve as a binder polymer in the disclosed coating compositions. The binder polymer amount may vary widely depending on a variety of considerations including the method of application, the presence of other film-forming materials, whether the coating composition is a water-based or solvent-based system, and so on. For liquid-based coating compositions, the binder polymer will typically constitute at least 10 wt-%, more typically at least 30 wt-%, and even more typically at least 50 wt-% of the coating composition, based on the total weight of resin solids in the coating composition. For such liquid-based coating compositions, the binder polymer will typically constitute less than about 90 wt-%, more typically less than about 80 wt-%, and even more typically less than about 70 wt-% of the coating composition, based on the total weight of resin solids in the coating composition.

Preferred coating compositions are substantially free, more preferably essentially free, and more preferably completely free of one or more or all of mobile: BPA, bisphenol S ("BPS"), bisphenol F, bisphenol A diglycidyl ether (BADGE), bisphenol S diglycidyl ether, and bisphenol F diglycidyl ether. Preferred coating compositions are also substantially free, more preferably essentially free, and more preferably completely free of one or more or all of bound: BPA, bisphenol S, bisphenol F, bisphenol A diglycidyl ether (BADGE), bisphenol S diglycidyl ether, and bisphenol F diglycidyl ether.

In preferred embodiments, the coating composition is at least substantially free, and more preferably completely free, of mobile or bound polyhydric phenols having estrogenic agonist activity greater than or equal to that of 4,4'-(propane-2,2-diyl)diphenol. Even more preferably, the coating composition is at least substantially free, and more preferably completely free, of mobile or bound polyhydric phenols having estrogenic agonist activity (e.g., in the MCF-7 assay) greater than or equal to that of BPS. Even more preferably, the coating composition is at least substantially free, and more preferably completely free, of mobile or bound polyhydric phenols having estrogenic agonist activity (e.g., in the MCF-7 assay) greater than that of 4,4'-(propane-2,2-diyl)bis(2,6-dibromophenol). Optimally, the coating composition is at least substantially free, and more preferably completely free, of mobile or bound polyhydric phenols having estrogenic agonist activity (e.g., in the MCF-7 assay) greater than about that of 2,2-bis(4-hydroxyphenyl)propanoic acid).

In some embodiments, the coating composition is "PVC-free." That is, in some embodiments, the coating composition preferably contains less than 2 wt-% of vinyl chloride materials, more preferably less than 0.5 wt-% of vinyl chloride materials, and even more preferably less than 1 ppm of vinyl chloride materials. In some embodiments, the coating composition preferably includes less than 2 wt-% of halogenated compounds (e.g., compounds containing a fluorine atom (F), chlorine atom (Cl), or bromine atom (Br)), more preferably less than 0.5 wt-% of halogenated compounds, and even more preferably less than 1 ppm of halogenated compounds.

When the disclosed coating compositions include polymers having suitable reactive groups (for example, amino groups, phenyl hydroxyl groups, acid or anhydride groups, or ethylenically unsaturated groups), the coating composition preferably also is formulated using one or more optional curing agents (for example, crosslinking resins, sometimes referred to as "crosslinkers"). The choice of a particular crosslinker typically depends on the particular product being formulated. For example, some coating compositions are highly colored (e.g., gold-colored coatings). These coatings may typically be formulated using crosslinkers that themselves tend to have a yellowish color. In contrast, white coatings are generally formulated using non-yellow or non-yellowing crosslinkers, or only a small amount of a yellow or yellowing crosslinker.

Suitable examples of curing agents include hydroxyl-reactive curing resins such as phenoplasts, aminoplast, blocked or unblocked isocyanates, or mixtures thereof.

Exemplary phenoplast resins include the condensation products of aldehydes with phenols. Formaldehyde and acetaldehyde are preferred aldehydes. Various phenols can be employed including phenol, cresol, p-phenylphenol, p-tert-butylphenol, p-tert-amylphenol and cyclopentylphenol. The phenoplast resins may be of either the resole type or the novolac type, or a mixture thereof.

Exemplary aminoplast resins are the condensation products of aldehydes such as formaldehyde, acetaldehyde, crotonaldehyde, and benzaldehyde with amino- or amido-group-containing substances such as urea, melamine, and benzoguanamine. Examples of suitable aminoplast crosslinking resins include, without limitation, benzoguanamine-formaldehyde resins, melamine-formaldehyde resins, etherified melamine-formaldehyde, and urea-formaldehyde resins.

Exemplary other generally suitable curing agents include blocked or non-blocked aliphatic, cycloaliphatic or aromatic di-, tri-, or poly-valent isocyanates, such as hexamethylene diisocyanate, cyclohexyl-1,4-diisocyanate, and the like. Further non-limiting examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates having an Mn of at least about 300, more preferably at least about 650, and even more preferably at least about 1,000 may be used. Polymeric blocked isocyanates are useful in certain embodiments. Exemplary polymeric blocked isocyanates include a biuret or isocyanurate of a diisocyanate, a trifunctional "trimer", or a mixture thereof. Commercially available blocked polymeric isocyanates include TRIXENE™ BI 7951, TRIXENE BI 7984, TRIXENE BI 7963, TRIXENE BI 7981 (available from Baxenden Chemicals, Ltd., Accrington, Lancashire, England); DESMODUR™ BL 3175A, DESMODUR BL3272, DESMODUR BL3370, DESMODUR BL 3475, DESMODUR BL 4265, DESMODUR PL 340, DESMODUR VP LS 2078, DESMODUR VP LS 2117, and DESMODUR VP LS 2352 (available from Bayer Corp., Pittsburgh, Pa., USA); and combinations thereof. Exemplary trimers include a trimerization product prepared from on average three diisocyanate molecules or a trimer prepared from on average three moles of diisocyanate (e.g., HMDI) reacted with one mole of another compound such as, for example, a triol (e.g., trimethylolpropane).

The level of curing agent (viz., crosslinker) used will typically depend on the type of curing agent, the time and temperature of the bake, and the molecular weight of the binder polymer. If used, the crosslinker is typically present in an amount of up to 50 wt-%, preferably up to 30 wt-%, and more preferably up to 15 wt-%, based on the total weight of the resin solids in the coating composition. If used, a crosslinker is preferably present in an amount of at least 0.1 wt-%, more preferably at least 1 wt-%, and even more preferably at least 1.5 wt-%, based upon the total resin solids weight.

The disclosed coating compositions may also include other optional polymers that do not adversely affect the coating composition or a cured coating thereof. Such optional polymers are typically included as a nonreactive filler material, although they may be included as a reactive crosslinker, or to provide other desired properties. Such optional nonreactive filler polymers include, for example, polyesters, acrylics, polyamides, and polyethers. Alternatively, such additional polymeric materials or monomers may be reactive with other components of the composition (e.g., an acid-functional or unsaturated polymer). If desired, reactive polymers may be incorporated into the disclosed compositions, for example to provide additional functionality for various purposes, including crosslinking or to assist in dispersing the disclosed upgraded molecular weight polymers into water. Examples of such reactive polymers include, for example, functionalized polyesters, acrylics, polyamides, and polyethers.

Another preferred optional ingredient is a catalyst to increase the rate of cure. Examples of catalysts, include, but are not limited to, strong acids including phosphoric acid, dodecylbenzene sulfonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid; quaternary ammonium compounds; phosphorous compounds; and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons having ordinary skill in the art. If used, a catalyst is preferably present in an amount of at least 0.01 wt-%, and more preferably at least 0.1 wt-%, based on the weight of nonvolatile material in the coating composition. If used, a catalyst is preferably present in an amount of no greater than 3 wt-%, and more preferably no greater than 1 wt-%, based on the weight of nonvolatile material in the coating composition.

Another useful optional ingredient is a lubricant (e.g., a wax), which facilitates manufacture of fabricated metal articles (e.g., container closures and food or beverage can ends) by imparting lubricity to sheets of coated metal substrate. Non-limiting examples of suitable lubricants include, for example, natural waxes such as Carnauba wax or lanolin wax, polytetrafluoroethane (PTFE) and polyethylene-type lubricants. If used, a lubricant is preferably present in the coating composition in an amount of at least 0.1 wt-%, and preferably no greater than 2 wt-%, and more preferably no greater than 1 wt-%, based on the total weight of nonvolatile material in the coating composition.

Another useful optional ingredient is a pigment, such as titanium dioxide. If used, a pigment is present in the disclosed coating composition in an amount of no greater than 70 wt-%, more preferably no greater than 50 wt-%, and even more preferably no greater than 40 wt-%, based on the total weight of solids in the coating composition.

Surfactants may optionally be added to the disclosed coating composition to aid in flow and wetting of a substrate. Examples of surfactants include, but are not limited to, nonylphenol polyethers and salts and similar surfactants known to persons having ordinary skill in the art. If used, a surfactant is preferably present in an amount of at least 0.01 wt-%, and more preferably at least 0.1 wt-%, based on the weight of resin solids. If used, a surfactant is preferably present in an amount no greater than 10 wt-%, and more preferably no greater than 5 wt-%, based on the weight of resin solids.

The disclosed coating compositions may also include other optional ingredients that do not adversely affect the coating composition or cured coating thereof. Such optional ingredients are typically included in a coating composition to enhance composition esthetics; to facilitate manufacturing, processing, handling, or application of the composition; or to further improve a particular functional property of a coating composition or a cured coating thereof. For example, the disclosed coating compositions may optionally include fillers other than those already mentioned, dyes, colorants, toners, coalescents, extenders, anticorrosion agents, flow control agents, thixotropic agents, dispersing agents, antioxidants, oxygen-scavenging materials, adhesion promoters, light stabilizers, and mixtures thereof, as required to provide desired film properties. Each optional ingredient is preferably included in a sufficient amount to serve its intended purpose, but not in such an amount to adversely affect a coating composition or a cured coating thereof.

The disclosed coating compositions may be present as a layer of a mono-layer coating system or as one or more layers of a multi-layer coating system. The coating composition can be used as a primer coat, an intermediate coat, a top coat, or a combination thereof. The coating thickness of a particular layer and of the overall coating system will vary depending upon the coating material used, the substrate, the coating application method, and the end use for the coated article. Mono-layer or multi-layer coating systems including one or more layers formed from the disclosed coating composition may have any suitable overall coating thickness, but in packaging coating applications (e.g., food or beverage containers or portions thereof) will typically have an overall average dry coating thickness of from about 2 to about 60 micrometers and more typically from about 3 to about 12 micrometers.

The disclosed coating compositions may be applied to a substrate (typically a metal substrate) either prior to, or after, the substrate is formed into an article such as, for example, a food or beverage container or a portion thereof. In one embodiment, a method of forming food or beverage cans is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, two-piece or three-piece cans or portions thereof such as riveted beverage can ends with a cured coating of the disclosed coating composition on a surface thereof can be formed in such a method. In another embodiment, a method of forming food or beverage cans is provided that includes: forming (e.g., via stamping) a metal substrate into a packaging container or a portion thereof (e.g., a food or beverage can or a portion thereof), applying a coating composition described herein to the inside, outside or both inside and outside portions of such packaging container or a portion thereof, and hardening the composition. For example, the coating composition may be spray applied to an interior surface of a preformed food or beverage can (e.g., as typically occurs with "two-piece" food or beverage cans). The disclosed upgraded molecular weight polymers are especially desirable for use on the inside or interior portion of such food or beverage containers, and for other applications involving a food or beverage contact surface or involving a metal substrate. Exemplary such applications include two-piece drawn food cans, three-piece food cans, food can ends, drawn and ironed food or beverage cans, beverage can ends, easy open can ends, twist-off closure lids, and the like.

Suitable metal substrates include, for example, steel or aluminum. The metal substrate used in forming rigid food or beverage cans, or portions thereof, typically has a thickness in the range of about 0.005 inches to about 0.025 inches. Electro tinplated steel, cold-rolled steel, and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The coating composition can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. Where the coating is used to coat metal sheets or coils, the coating can be applied by roll coating.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step. The cure conditions will vary depending upon the method of application and the intended end use. The curing process may be performed at any suitable temperature, including, for example, oven temperatures in the range of from about 100° C. to about 300° C., and more typically from about 177° C. to about 250° C. If a metal coil is the substrate to be coated, curing of the applied coating composition may be conducted, for example, by heating the coated metal substrate over a suitable time period to a peak metal temperature ("PMT") of preferably greater than about 177° C. More preferably, the coated metal coil is heated for a suitable time period (e.g., about 5 to 900 seconds) to a PMT of at least about 218° C.

Test Methods

The disclosed coating compositions may be evaluated using a variety of test methods, including:

A. Solvent Resistance Test

The extent of "cure" or crosslinking of a coating is measured as a resistance to solvents, such as methyl ethyl ketone (MEK). This test is performed as described in ASTM D 5402-93. The number of double rubs (viz., one back-and-forth motion) is reported. Preferably, the MEK solvent resistance is at least 30 double rubs.

B. Retort Method

This test provides an indication of an ability of a coating to withstand conditions frequently associated with food or beverage preservation or sterilization. Coated ETP flat panels may be placed in a vessel and partially immersed in a test substance. While totally immersed in the test substance, the coated substrate samples are placed in an autoclave and subjected to heat of 130° C. and pressure of 1 atmosphere above atmospheric pressure for a time period of 60 minutes. Just after retort, the coated substrate samples are tested for metal exposure.

C. Wedge Bend Test

This test provides an indication of a level of flexibility of a coating and its extent of cure. Test wedges are formed from coated 12 cm long by 5 cm wide rectangular metal test sheets. Test wedges are formed from the coated sheets by folding (viz., bending) the sheets around a mandrel. To accomplish this, the mandrel is positioned on the coated sheets so that it is oriented parallel to, and equidistant from, the 12 cm edges of the sheets. The resulting test wedges have a 6 mm wedge diameter and a length of 12 cm. To assess the wedge bend properties of the coatings, the test wedges are positioned lengthwise in a metal block of a wedge bend tester and a 2.4 kg weight is dropped onto the test wedges from a height of 60 cm. The deformed test wedges are then immersed in a copper sulphate test solution (prepared by combining 20 parts of $CuSO_4.5H_2O$, 70 parts of deionized water, and 10 parts of hydrochloric acid (36%)) for about 2 minutes. The exposed metal is examined under a microscope and the millimeters of coating failure along the deformation axis of the test wedges is measured. The results may be expressed as a wedge bend percentage using the following calculation:

$$100\% \times [(120 \text{ mm}) - (\text{mm of failure})]/(120 \text{ mm}).$$

A coating is considered to satisfy the Wedge Bend Test if it exhibits a wedge bend percentage of 70% or more.

D. Metal Exposure

This test measures the ability of a coated substrate to retain its integrity as it undergoes the formation process necessary to produce a fabricated article such as a can end. It is a measure of the presence or absence of cracks or fractures in the formed end. The end is typically placed on a cup filled with an electrolyte solution. The cup is inverted to expose the surface of the end to the electrolyte solution. The intensity of electrical current that passes through the end is then measured. If the coating remains intact (no cracks or fractures) after fabrication, minimal current will pass through the end.

For the present evaluation, fully converted standard food can ends were exposed for a period of approximately 4 seconds to a room-temperature electrolyte solution comprised of 1% NaCl by weight in deionized water. The coating evaluated was present on the interior surface of the end. Metal exposure was measured using a WACO Enamel Rater II (available from the Wilkens-Anderson Company, Chicago, Ill.) with an output voltage of 6.3 volts. The measured electrical current, in milliamps, is reported. End continuities were tested initially and then after the ends were subjected to retort. After cooling and drying, the milliamps of current passing through the end was measured again.

Preferred coatings of the present invention initially pass less than 10 milliamps (mA) when tested as described above, more preferably less than 5 mA. After retort, preferred coatings give continuities of less than 20 mA, more preferably less than 10 mA, and even more preferably less than 5 mA.

E. Differential Scanning Calorimetry

Samples for differential scanning calorimetry ("DSC") testing are prepared by first applying the liquid resin composition onto aluminum sheet panels. The panels are then baked in a Fisher Isotemp electric oven for 20 minutes at 300° F. (149° C.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

The invention is illustrated by the following examples. It is to be understood that the particular examples, materials, amounts, and procedures are merely illustrative and that other embodiments may be made as described. Unless otherwise indicated, all parts and percentages are by weight.

Example 1

PCC Compound Synthesis 24 grams (0.15 moles) of para-diacetylbenzene and 350 grams of liquid ammonia were added to a stainless steel autoclave. The mixture was saturated with acetylene at room temperature to reach 4 to 5 bars of pressure. 2 grams KOH (0.018 moles) were added and the reaction mixture was left overnight at room temperature. After release of the gas pressure, the reaction mixture was diluted with ice water (200 milliliters) and neutralized with hydrochloric acid (36%). The resulting yellow oil was gradually crystallized, filtered, washed and dried. This product was identified by nuclear magnetic resonance (NMR) as the addition product of diacetylbenzene and acetylene. The yield was 70% (calculated on diacetyle benzene) and the melting point was determined to 141-143° C. The structure of the adduct product was determined to be as follows:

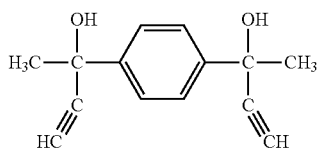 [SMILES: C#CC(C)(O)c1ccc(C(C)(O)C#C)cc1]

The adduct (1.071 grams, 5 millimoles) was mixed with 0.043 grams 1,3-bis(2,6-disopropylphenyl)-imidazolidinium chloride (CAS 258278-25-0) and 0.017 grams silver acetate in 6.061 milliliters (mL) dichloromethane. The reaction mixture was stirred at 80° C. under 25 atm carbon dioxide pressure during 24 hours. After dissolution of the resulting reaction product in 10 mL dichloroethane and filtration, the product was crystallized from a mixture of dichloromethane/diethyl ether. This product was identified via NMR as the below depicted dicyclocarbonate species. The yield was 71% (calculated on the Example 1 adduct) and the melting point was of the material was 133 to 135° C.

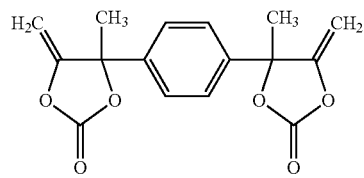

Example 2

PCC Compound Synthesis 101.5 grams (0.4567 moles) of resorcinol diglycidyl ether (CAS No. 101-90-6), 1.98 grams (0.0228 moles) of lithium bromide (CAS No. 7550-35-8) (5% mol/resorcinol DGE), and 150 grams of dimethylformamide were loaded in a 500 ml pressure sealed reactor equipped with a stirrer and temperature and pressure regulation. At 80° C., carbon dioxide was introduced so that the internal pressure of the reactor reached 10 bars. Reaction progress was followed by Proton NMR and the mixture was maintained at 80° C. until the signals of the protons on the carbon of the oxirane disappeared.

After evaporation of the dimethylformamide under partial vacuum, the yield of dicyclocarbonate was 141 gram (quantitative). The product was identified by Proton NMR with acetonitrile as internal standard and contained 5.915 milliequivalents cyclocarbonate per gram of product.

Example 3

Polyether Polymer Synthesis

It is expected that a polyether polymer can be produced via condensation of the dicyclocarbonate compound of Example 1 with a dihydric phenol (e.g., hydroquinone) in presence of a basic catalyst (e.g., triethylamine) using reaction conditions and equipment that will familiar to those skilled in the art. The expected polyether polymer product is depicted below.

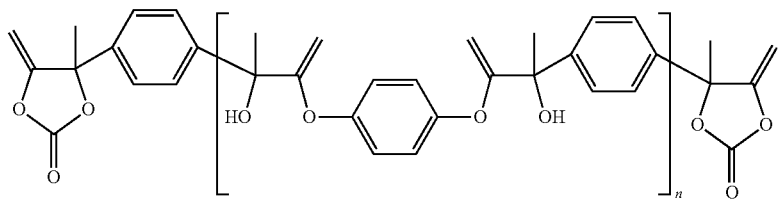

Example 4

Polyether Polymer Synthesis

Polyether polymers were produced using the ingredients, in the indicated amounts, included in the below Table 1.

TABLE 1

| | Ingredient | Ex. 4, Run 1 (weight parts) | Ex. 4, Run 2 (weight parts) |
|---|---|---|---|
| 1 | Example 2 resorcinol dicyclocarbonate | 30 | 30 |
| 2 | Bisphenol A | 20 | 0 |
| 3 | 4,4'-methylenebis(2,6-dimethylphenol) | 0 | 22.4 |

TABLE 1-continued

| | Ingredient | Ex. 4, Run 1 (weight parts) | Ex. 4, Run 2 (weight parts) |
|---|---|---|---|
| 4 | Catalyst | 0.1 | 0.1 |
| 5 | SOLVESSO 150 | 28.4 | 29.9 |
| 6 | Butanol | 14 | 14.9 |
| 7 | Dowanol PMA | 0 | 22.4 |

Ingredients 1-3 were placed in a round bottom glass flask equipped with a stirrer and total condenser equipped with a gas bubbler. The equipment was flushed with nitrogen. The mixture was heated slowly to 130-135° C. Carbon dioxide started to be produced when the mixture reached 110° C. At 135° C., ingredient 4 was added and the mixture was heated slowly to 200-210° C. in order to maintain a permanent and gentle emission of carbon dioxide. The mixture was maintained at this temperature until the carbonate bands (measured using infrared spectroscopy) disappears. The product was cooled to 180° C. and ingredient 5 was added. When the mixture reached 125° C., ingredients 6 and 7 were added.

The mixture of Run 1 was determined to have a viscosity of 137 poise (Noury 25° C.) and a non-volatile content (1 gram sample heated for 30 minutes in 180° C. oven) of 49.7%. The mixture of Run 2 was determined to have a viscosity of 6.6 poise (Noury 25° C.) and a non-volatile content (1 gram sample heated for 30 minutes in 180° C. oven) of 40.4%.

The glass transition temperature of one of the resin samples was determined to be 67° C.

Example 5

Coating Compositions

Coating compositions were produced using the ingredients included in the below Table 2.

TABLE 2

| | Ingredient | Ex. 5, Run 1 (weight parts) | Ex. 5, Run 2 (weight parts) | Ex. 5, Run 3 (weight parts) |
|---|---|---|---|---|
| 1 | Example 4, Run 1 Resin | 114 | 114 | |
| 2 | Example 4, Run 2 Resin | | | 142 |
| 3 | Resole-type phenolic resin | 13.5 | 8.5 | 13.5 |
| 4 | H3PO4 10 % in Dowanol PM | 0.5 | 0.5 | 0.5 |
| 5 | Xylene | 9 | 9 | 9 |
| 6 | Butanol | 4 | 4 | 4 |
| 7 | Methyl ethyl ketone | 14 | 14 | 10 |
| 8 | Polyethylene wax dispersion | 2 | 2 | 2 |

Ingredients 1 and 2 were mixed with ingredient 3 and the mixture homogenized. Ingredient 4 was added and the viscosity was adjusted with solvent to fall in the range of 60-70 second (Afnor 4).

The coating compositions were applied with a handcoater to achieve a dry film weight of 6 to 8 grams per square meter on ETP panels. The coated substrate was cured for 10 minutes in a 200° C. oven. 12 hours after cooling, the coated metal panels were stamped to produce regular food can ends, which were then retorted in a solution of 3% acetic acid in water or 1% NaCl in water. Coatings data for these samples are provided in the below Table 3.

TABLE 3

| Test | Ex. 5, Run 1 | Ex. 5, Run 2 | Ex. 5, Run 3 |
|---|---|---|---|
| Wedge bend | 83% | 84% | 76% |
| MEK double rubs | >100 | >100 | >100 |
| Metal exposure before retort | 3.3 mA | 6.1 mA | 119 mA |
| Metal exposure after retort in water | 5 mA | 7 mA | 115 mA |
| Metal exposure after retort in 3% acetic acid retort | 5 mA | 5 mA | 110 mA |
| Metal exposure after retort in 1% NaCl | 5 mA | 8 mA | 87 mA |

As evidenced by the data in Table 3, each of the coatings of runs 1-3 exhibited good flexibility in the wedge bend test and excellent performance in the MEK double rub solvent resistance test. The coatings of Runs 1 and 2, when present on a fabricated food can end, also exhibited low metal exposure values both before and after retort, which indicates that these coatings are capable of withstanding fabrication while still maintaining good adhesion and coating continuity and, moreover, exhibit good corrosion resistance even after fabrication and retort.

While the coating of Run 3 exhibited higher metal exposure values than Runs 1 and 2, the metal exposures before and after retort were quite close, thereby indicating resistance to retort conditions. It is believed the initial metal retort value for Run 3 was high due to poor wettability of the substrate. It is believed the wettability can be improved by adjusting the surface tension of the coating composition by, for example, adjusting the solvent mixture and/or adding wetting agents.

Having thus described preferred embodiments of the present invention, those of skill in the art will readily appreciate that the teachings found herein may be applied to yet other embodiments within the scope of the claims hereto attached. The complete disclosure of all listed patents, patent documents and publications (including material safety data sheets, technical data sheets and product brochures for the raw materials and ingredients used in the Examples) are incorporated herein by reference as if individually incorporated.

What is claimed is:

1. An article comprising:
   a food or beverage container, or a portion thereof, having a metal substrate and a coating composition applied on at least a portion of the metal substrate, wherein the coating composition includes a polymer that is a reaction product of ingredients including: (i) an extender having at least two functional groups reactive with a cyclocarbonate group and (ii) a polycyclocarbonate compound; and
   wherein the polycyclocarbonate compound includes a cyclic group other than a cyclocarbonate group, wherein the cyclic group comprises an alicyclic group; and wherein the alicyclic group comprises a cyclobutane group.

2. The article of claim 1, wherein the cyclic group comprises a polycyclic group.

3. An article comprising: a food or beverage container, or a portion thereof, having a metal substrate and a coating composition applied on at least a portion of the metal substrate, wherein the coating composition includes a polymer that is a reaction product of ingredients including: (i) an extender having at least two functional groups reactive with a cyclocarbonate group and (ii) a polycyclocarbonate compound; and wherein the extender comprises a dihydric phenol.

4. The article of claim 3, wherein the polycyclocarbonate compound is a dicyclocarbonate compound, and wherein the two cyclocarbonate groups of the dicyclocarbonate compound each include a 5-member carbonate-containing ring.

5. The article of claim 4, wherein the polycyclocarbonate compound has a molecular weight of less than 1,000 Daltons.

6. The article of claim 3, wherein the polycyclocarbonate compound is derived from a diepoxide of a diol containing a cyclic group.

7. The article of claim 3, wherein the polycyclocarbonate compound is free of ester linkages.

8. The article of claim 3, wherein the extender includes an aryl or heteroaryl group and has a molecular weight of less than 1,000 Daltons.

9. The article of claim 3, wherein the dihydric phenol comprises substituted or unsubstituted: hydroquinone, resorcinol, catechol, or a combination thereof.

10. The article of claim 3, wherein the polymer comprises a polyether polymer.

11. article of claim 10, wherein the polyether polymer has a glass transition temperature of at least 40° C. and a number average molecular weight of at least 2,000.

12. The article of claim 10 wherein the polyether polymer includes at least 25% by weight of aryl or heteroaryl groups.

13. The article of claim 10, wherein the polyether polymer is free of structural units derived from a bisphenol or a diepoxide of a bisphenol.

14. The article of claim 3, wherein the polycyclocarbonate compound has a structure of the below Formula (II):

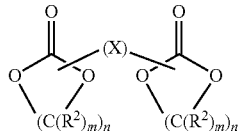

Formula (II)

wherein:
X is a divalent group;
each $R^2$ is independently hydrogen, oxygen, a carbon-containing group, a sulfur-containing group, an oxygen-containing group, a nitrogen-containing group, or a phosphorus-containing group;
each n is independently 2 to 13;
each m is independently 0 to 2, with the proviso that m is 0 or 1 for at least one —$C(R^2)_m$—group of each depicted cyclocarbonate group to allow for connection to X.

15. The article of claim 14, wherein:
X includes 2 or more carbon atoms;
each n is independently 2 or 3; and
each $R^2$ is independently a hydrogen atom or a carbon-containing group having from 1 to 10 carbon atoms.

16. The article of claim 15, wherein X includes a cyclic group.

17. The article of claim 3, wherein one or both of the extender and the polycyclocarbonate compound includes a segment of the below Formula (I):

—Ar—$(R_r$—Ar$)_t$—O—   Formula (I)

wherein:
each Ar is independently an aryl group or heteroaryl group;
each t is independently 0 or 1; and
R, if present, is a divalent organic group.

18. The article of claim 17, wherein each Ar comprises a phenylene group.

19. The article of claim 3, wherein the food or beverage container, or a portion thereof, includes the coating composition on an interior surface thereof.

20. A coating composition, comprising:
a polyether polymer, wherein the polyether polymer comprises a reaction product of ingredients including: (i) a dihydric monophenol and (ii) a polycyclocarbonate compound; and
a liquid carrier.

21. The coating composition of claim 20, wherein the polycyclocarbonate compound includes a cyclic group other than a cyclocarbonate group.

22. The coating composition of claim 21, wherein the cyclic group comprises an aryl or heteroaryl group.

23. The coating composition of claim 21, wherein the cyclic group comprises an alicyclic group.

24. The coating composition of claim 21, wherein the cyclic group comprises a polycyclic group.

25. The coating composition of claim 23, wherein the alicyclic group comprises a cyclobutane group.

26. The coating composition of claim 20, wherein the polycyclocarbonate compound is a dicyclocarbonate compound, and wherein the two cyclocarbonate groups of the dicyclocarbonate compound each include a 5-member carbonate-containing ring.

27. The coating composition of claim 26, wherein the polycyclocarbonate compound has a molecular weight of less than 1,000 Daltons.

28. The coating composition of claim 20, wherein the polycyclocarbonate compound is derived from a diepoxide of a diol containing a cyclic group.

29. The coating composition of claim 20, wherein the dihydric monophenol comprises substituted or unsubstituted: hydroquinone, resorcinol, catechol, or a combination thereof.

30. The coating composition of claim 20, wherein the polyether polymer is free of structural units derived from a bisphenol or a diepoxide of a bisphenol.

* * * * *